US011176630B2

(12) United States Patent
Prager et al.

(10) Patent No.: US 11,176,630 B2
(45) Date of Patent: Nov. 16, 2021

(54) DYNAMIC UAV TRANSPORT TASKS

(71) Applicant: Wing Aviation LLC, Mountain View, CA (US)

(72) Inventors: André Prager, Sunnyvale, CA (US); Gaurav Garg, Cupertino, CA (US); Jonathan Lesser, Oakland, CA (US); Theran Cochran, Tucson, CA (US)

(73) Assignee: Wing Aviation LLC, Mountain View, CA (US)

( * ) Notice: Subject to any disclaimer, the term of this patent is extended or adjusted under 35 U.S.C. 154(b) by 151 days.

(21) Appl. No.: 15/851,690

(22) Filed: Dec. 21, 2017

(65) Prior Publication Data

US 2019/0197646 A1 Jun. 27, 2019

(51) Int. Cl.
*G06Q 50/30* (2012.01)
*B64C 39/02* (2006.01)
(Continued)

(52) U.S. Cl.
CPC ........... *G06Q 50/30* (2013.01); *B64C 39/024* (2013.01); *G05D 1/0094* (2013.01); *G05D 1/101* (2013.01);
(Continued)

(58) Field of Classification Search
CPC .... G06Q 50/30; G06Q 10/0833; G06Q 10/08; G06Q 10/083; G06Q 10/0832; B64C 39/024; B64C 2201/128; B64C 2201/141; B64C 2201/146; B64C 2201/12; G05D 1/0094; G05D 1/101; G08G 5/003
(Continued)

(56) References Cited

U.S. PATENT DOCUMENTS 9,174,733 B1 11/2015 Burgess et al.
9,489,852 B1 * 11/2016 Chambers .............. G05D 1/101
(Continued)

OTHER PUBLICATIONS

International Searching Authority, International Search Report and Written Opinion dated Apr. 5, 2019, issued in connection with International Patent Application No. PCT/US2018/064216, filed on Dec. 6, 2018, 12 pages.
(Continued)

*Primary Examiner* — Richard A Goldman
(74) *Attorney, Agent, or Firm* — McDonnell Boehnen Hulbert & Berghoff LLP

(57) ABSTRACT

Example implementations relate to a method of dynamically updating a transport task of a UAV. The method includes receiving, at a transport-provider computing system, an item provider request for transportation of a plurality of packages from a loading location at a given future time. The method also includes assigning, by the transport-provider computing system, a respective transport task to each of a plurality of UAVs, where the respective transport task comprises an instruction to deploy to the loading location to pick up one or more of the plurality of packages. Further, the method includes identifying, by the transport-provider system, a first package while or after a first UAV picks up the first package. Yet further, the method includes based on the identifying of the first package, providing, by the transport-provider system, a task update to the first UAV to update the respective transport task of the first UAV.

21 Claims, 14 Drawing Sheets

(51) Int. Cl.
*G05D 1/00* (2006.01)
*G06Q 10/08* (2012.01)
*G05D 1/10* (2006.01)

(52) U.S. Cl.
CPC .... *G06Q 10/0833* (2013.01); *B64C 2201/128* (2013.01); *B64C 2201/141* (2013.01); *B64C 2201/146* (2013.01)

(58) Field of Classification Search
USPC .......................................................... 701/2, 3
See application file for complete search history.

(56) References Cited

U.S. PATENT DOCUMENTS

| | | | |
|---|---|---|---|
| 9,815,633 | B1 | 11/2017 | Kisser et al. |
| 10,131,437 | B1* | 11/2018 | Hanlon .................... B64D 1/12 |
| 2014/0222248 | A1* | 8/2014 | Levien ................. B64C 39/024 701/2 |
| 2016/0033966 | A1 | 2/2016 | Farris et al. |
| 2016/0180274 | A1 | 6/2016 | Zwakhals et al. |
| 2016/0185466 | A1 | 6/2016 | Dreano, Jr. |
| 2016/0253907 | A1 | 9/2016 | Taveira |
| 2017/0039510 | A1 | 2/2017 | Ogilvie et al. |
| 2017/0106978 | A1 | 4/2017 | Cohen et al. |
| 2017/0121021 | A1 | 5/2017 | Bonazzoli et al. |
| 2017/0246739 | A1* | 8/2017 | Frisby ..................... E05F 1/002 |
| 2017/0286892 | A1* | 10/2017 | Studnicka ............. G06Q 20/26 |
| 2017/0293991 | A1* | 10/2017 | High ....................... B64D 1/22 |
| 2017/0308849 | A1 | 10/2017 | Roush et al. |
| 2017/0323257 | A1 | 11/2017 | Cheatham, III et al. |
| 2018/0092484 | A1* | 4/2018 | Lewis .................... G08G 5/025 |
| 2018/0218320 | A1* | 8/2018 | Lee ..................... G06K 9/00671 |
| 2019/0250636 | A1* | 8/2019 | Szubbocsev ......... G05D 1/0225 |
| 2019/0278961 | A1* | 9/2019 | Schrader .................. B07C 3/14 |
| 2019/0354919 | A1* | 11/2019 | Mahboob .................. B07C 3/20 |

OTHER PUBLICATIONS

International Bureau, International Preliminary Report on Patentability dated Jul. 2, 2020, issued in connection with International Patent Application No. PCT/US2018/064216 filed on Dec. 6, 2018, 9 pages.

Andreas, Donath, "Paketkopter: DHL testet selbstladende Drohne erfolgreich in Bayern," Golem.de, May 10, 2016, 2 pages, retrieved from the internet: URL:https://www.golem.de/news/paketkopter-dhl-testet-selbstladende-drohne-erfolgreich-in-bayem-1605-120793.html.

Dhanalakshmi et al., "Implementation of Highly Automated UAV with GPS for Product Delivery Using Lab View," International Journal of Advances in Electronics and Computer Science, ISSN: 2393-2835, Nov. 2015, pp. 39-42, vol. 2, No. 11.

European Patent Office, Extended European Search Report dated Jun. 25, 2021, issued in connection wtih European patent application No. 18890891.7, 14 pages.

Australian Government, Examination Report No. 1 dated Mar. 31, 2021, issued in connection with Australian Patent App. No. 2018390751, 6 pages.

* cited by examiner

DYNAMIC UAV TRANSPORT TASKS

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

Such unmanned systems can be used by an aerial transport service provider (ATSP) to transport items. In practice, to provide transportation services to an item provider, an ATSP can deploy to a loading location a plurality of UAVs, each of which is assigned a specific package to pick up and deliver. As such, when each UAV arrives at the loading location, the item provider can identify the UAV in order to determine the packages that are assigned to the UAV. Then, the item provider can load into a payload compartment of the UAV the packages that are assigned to the UAV.

However, this process of loading a package into a payload compartment can take an unsatisfactorily long period of time, thereby hindering the efficiency and speed of the delivery. Particularly, the item provider must perform several steps when a UAV arrives at the loading location. For instance, the item provider must identify the UAV, determine the package that is assigned to the UAV, locate the package, and load the package into a payload compartment of the UAV. As the item provider performs these steps, the UAV is merely idling, and therefore, is wasting limited resources such as time and UAV battery power. Squandering such resources can negatively impact the speed, timeliness, and reliability of the transportation service provided by the ATSP. Additionally, these problems with the loading process are further expounded as the number of packages that the item provider wants to deliver increases.

SUMMARY

An aerial transport service provider (ATSP) can use a fleet of UAVs to provide entities with transportation services. In practice, to transport packages, the ATSP assigns each of the UAVs in the fleet a package to pick up from the entity. However, when a UAV picks up its assigned package, locating and loading the package can take a lengthy period of time, during which the UAV is idling, thereby wasting resources (e.g., time and UAV battery power). Squandering such resources can negatively impact the reliability and speed of the transportation service. Accordingly, example embodiments may help streamline the package pick-up process by dynamically updating a transport task of a UAV based on a package that is loaded into a payload compartment of the UAV. In particular, rather than assigning a UAV a specific package to pick up, the ATSP can generate a transport task for the UAV to pick up a package at random from the packages that are ready for delivery. Once the package is picked up, the package can be identified, and based on the identity of the package, the ATSP can dynamically update the transport task of the UAV to provide the UAV with a route to the package's delivery location.

In one aspect, a method is disclosed. The method includes receiving, at a transport-provider computing system, an item provider request for transportation of a plurality of packages from a loading location at a given future time. The method also includes the assigning, by the transport-provider computing system, a respective transport task to each of a plurality of unmanned aerial vehicles (UAV), wherein the respective transport task comprises an instruction to deploy to the loading location to pick up one or more of the plurality of packages. Further, the method includes, identifying, by the transport-provider computing system, a first package while or after a first UAV of the plurality of UAVs picks up the first package. Yet further, the method includes based on the identifying of the first package, providing, by the transport-provider computing system, a task update to the first UAV to update the respective transport task of the first UAV.

In another aspect, a UAV is disclosed. The UAV includes a payload compartment operable to hold one or more packages, and a package identification device arranged in an interior of the payload compartment, where the package identification device is configured to identify the one or more packages held in the payload compartment. The UAV also includes a computer apparatus having one or more processors and memory storing instructions that, when executed by the one or more processors, cause the system to carry out operations including: receiving, from a transport-provider computing system, a transport task indicating an instruction to fly to a loading location to pick up a package from a plurality of packages located at the loading location; causing the UAV to fly to the loading location; at the loading location, causing the UAV to pick up a first package from the plurality of packages; causing the package identification device to scan, sense or otherwise interact with a unique identifier of the first package; communicating the unique identifier to the transport-provider computing system; and in response, receiving a task update from the transport-provider computing system.

In yet another aspect, a method is disclosed. The method includes receiving, from a transport-provider computing system, a transport task indicating an instruction to fly to a loading location to pick up a package from a plurality of packages located at the loading location; causing the UAV to fly to the loading location; at the loading location, causing the UAV to pick up a first package from the plurality of packages; causing the package identification device to scan, sense or otherwise interact with a unique identifier of the first package; communicating the unique identifier to the transport-provider computing system; and in response, receiving a task update from the transport-provider computing system.

In yet another aspect, a non-transitory computer-readable medium is disclosed. The non-transitory computer-readable medium has stored thereon program instructions that when executed by the processor cause the computing device to perform a set of functions including: receiving an item provider request for transportation of a plurality of packages from a loading location at a given future time; assigning a respective transport task to each of a plurality of unmanned aerial vehicles (UAV), wherein the respective transport task comprises an instruction to deploy to the loading location to pick up one or more of the plurality of packages; identifying a first package while or after a first UAV of the plurality of UAVs picks up the first package; and based on the identifying of the first package, providing a task update to the first UAV to update the respective transport task of the first UAV.

In yet another aspect, a system is disclosed. The system includes means for: receiving an item provider request for transportation of a plurality of packages from a loading location at a given future time; assigning a respective transport task to each of a plurality of unmanned aerial vehicles (UAV), wherein the respective transport task comprises an instruction to deploy to the loading location to pick up one or more of the plurality of packages; identifying a first package while or after a first UAV of the plurality of UAVs picks up the first package; and based on the identifying of the first package, providing a task update to the first UAV to update the respective transport task of the first UAV.

These as well as other aspects, advantages, and alternatives, will become apparent to those of ordinary skill in the art by reading the following detailed description, with reference where appropriate to the accompanying drawings.

DETAILED DESCRIPTION

Figure 1A:
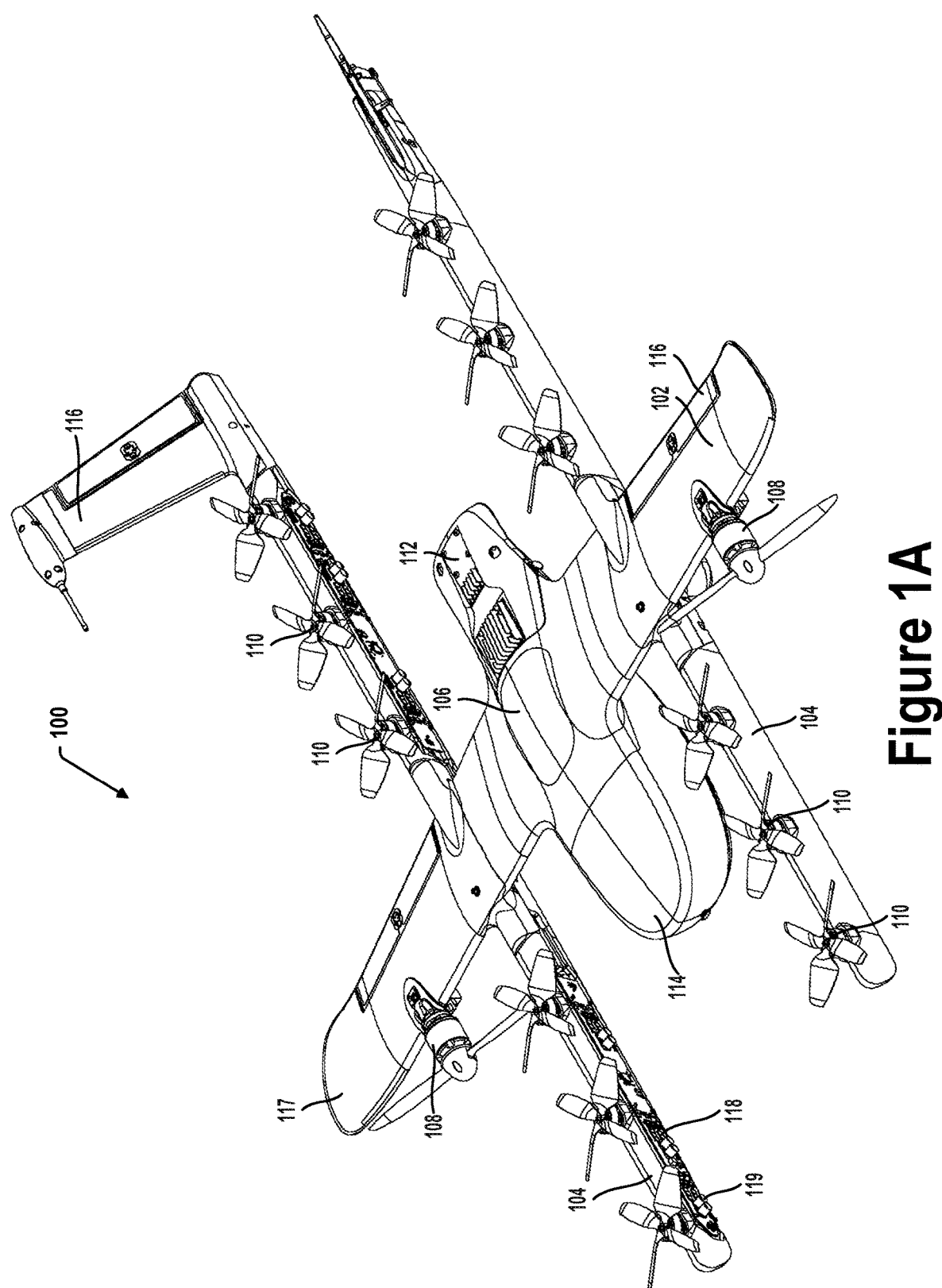
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

In some cases, an ATSP can be a separate entity from an entity or entities that provide items for transportation and/or interface with recipients who request delivery of the items. In these cases, the item provider could request transportation services when one or more packages (that each includes one or more items) are ready to be transported from a loading location, such as a warehouse operated by or affiliated with the item provider. Additionally and or alternatively, the item provider could have an agreement with the ATSP in which transportation services are provided at a scheduled date and/or time.

To overcome at least the problems described above with the loading process, disclosed herein are methods of dynamically updating a transport task of a UAV that is delivering a package. In an embodiment, in response to receiving a transport request from an item provider, the ATSP can assign each of one or more UAVs a respective transport task, where the respective transport task instructs the UAV to fly to the loading location and to pick up a package at random, in a predetermined order or sequence, or otherwise without specific package assignment, from the packages that are ready for delivery. Once a UAV picks up a package, the package can be identified, perhaps by using a device installed within the payload compartment of the UAV. Based on the identity of the package, the ATSP can determine a delivery location of the package, and can send the UAV a task update that specifies at least the delivery location of the package.

Accordingly, as opposed to assigning each UAV one or more specific packages to pick up, the ATSP can deploy UAVs to pick up packages at random, in a predetermined order or sequence, or otherwise without specific package assignment, from the loading location, and then can dynamically update the transport task of each UAV based on the package that the UAV picks up. By doing so, the ATSP can eliminate the need for an extensive loading process, thereby conserving resources such as time and UAV battery power, which in turn, increases the efficiency and speed of the transport service.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
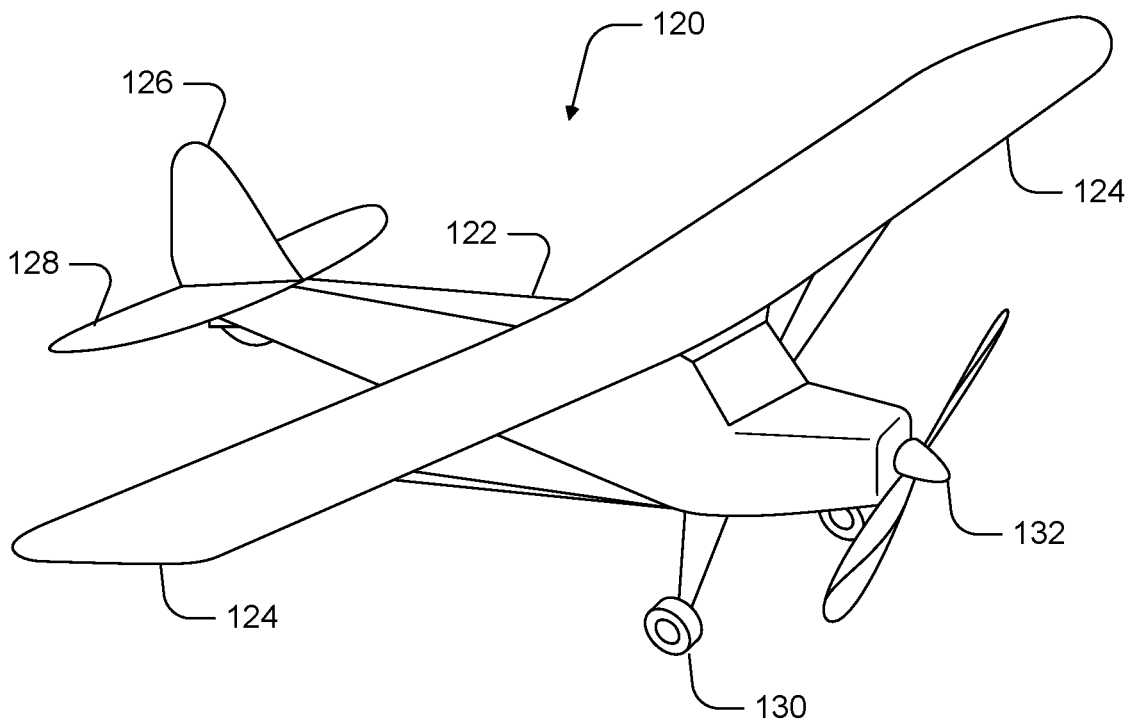
FIG. 1B is a simplified illustration of an unmanned aerial vehicle, according to example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
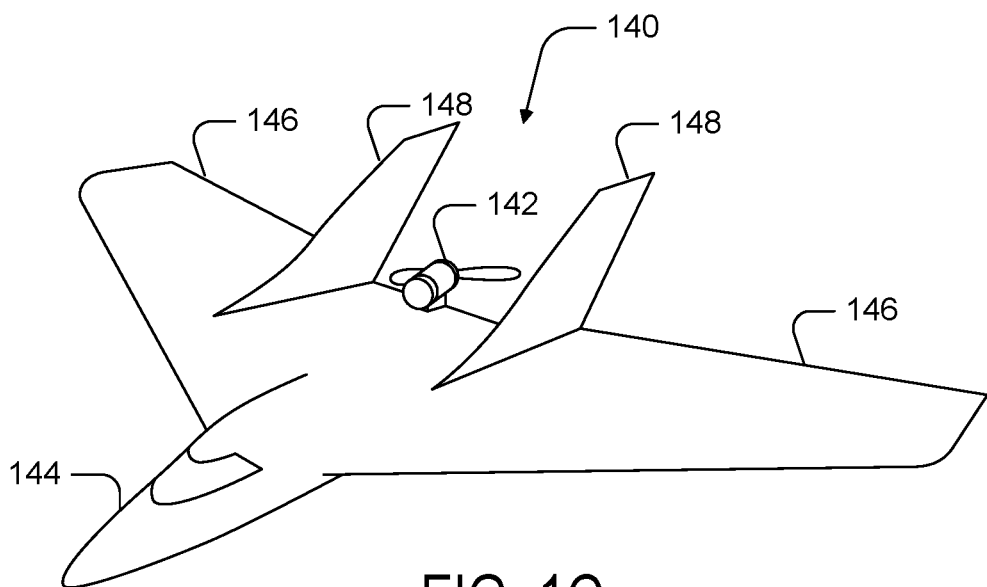
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
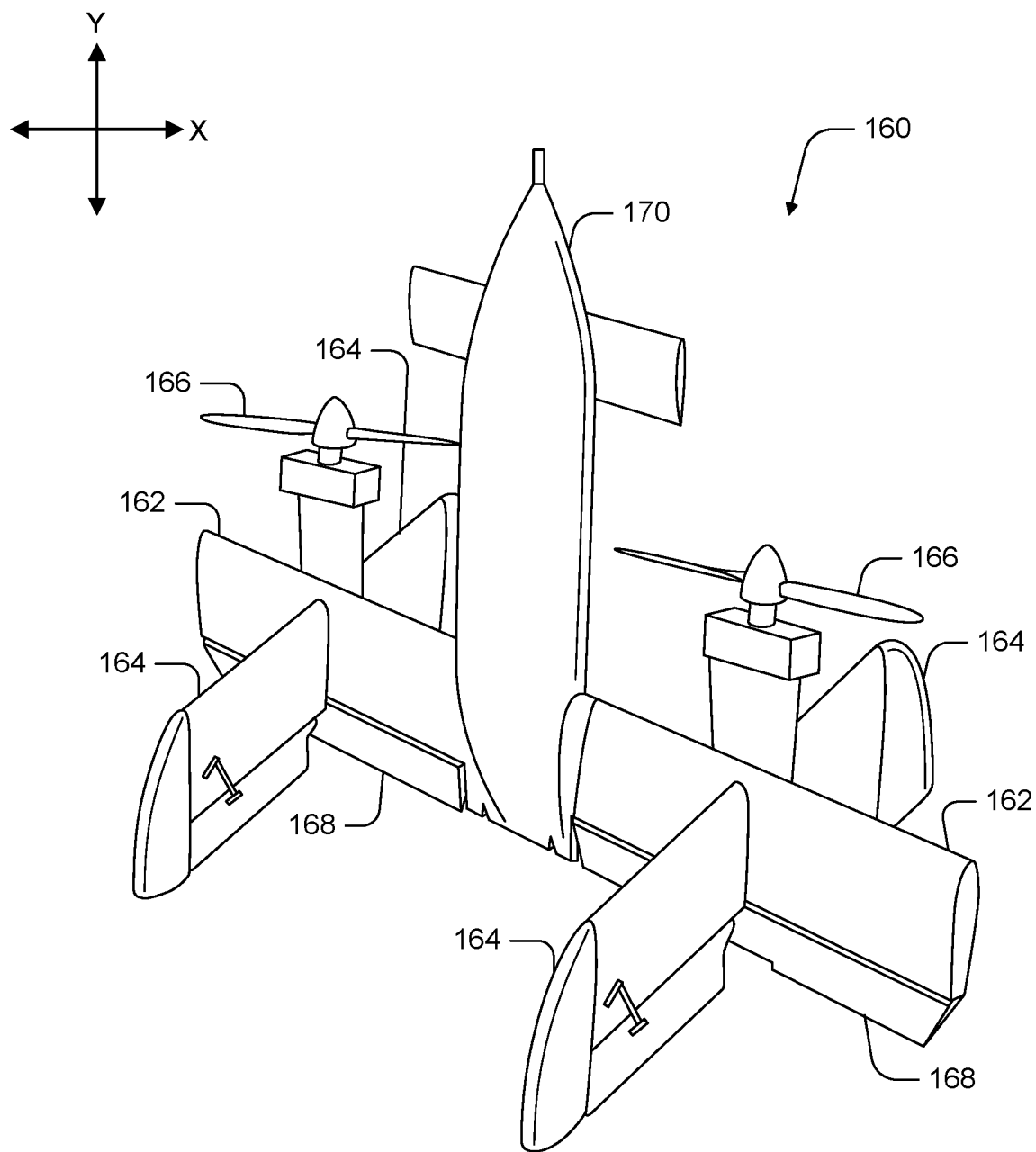
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
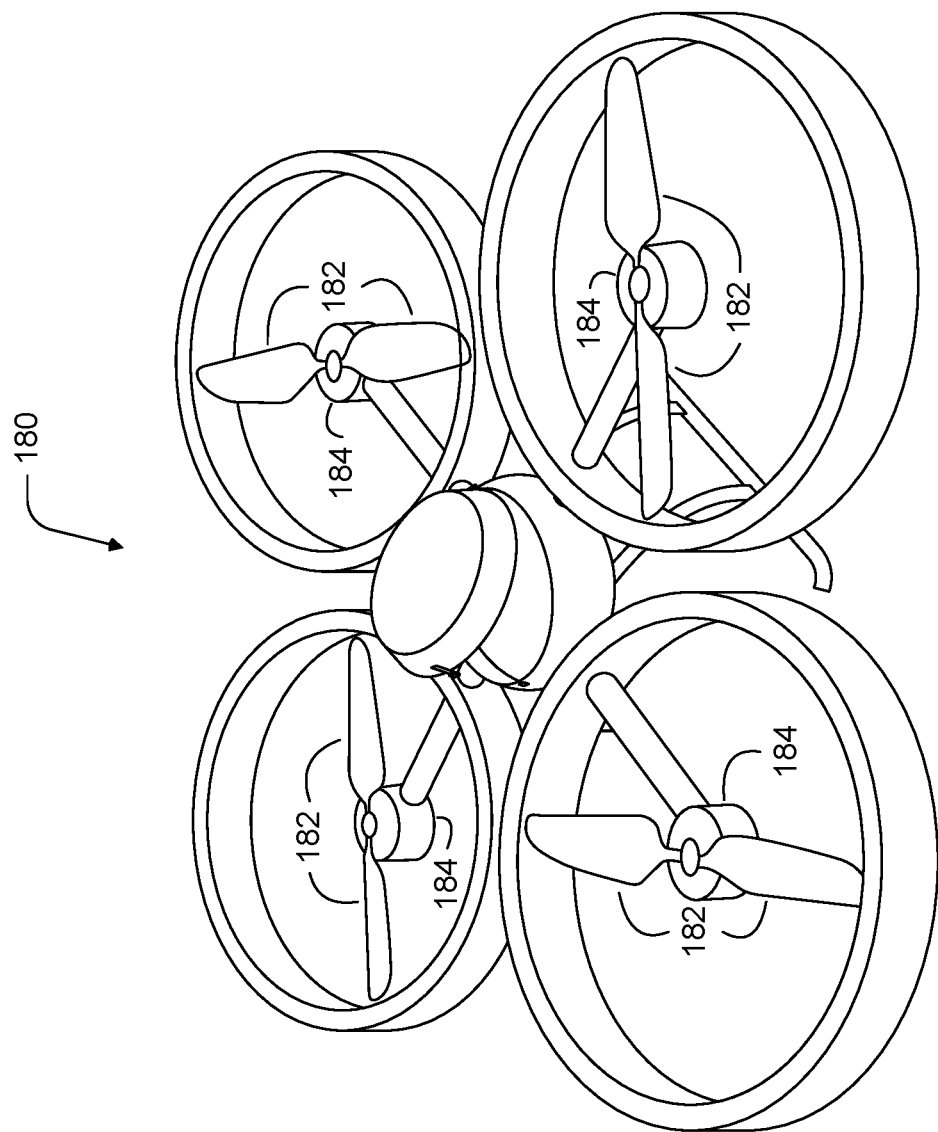
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
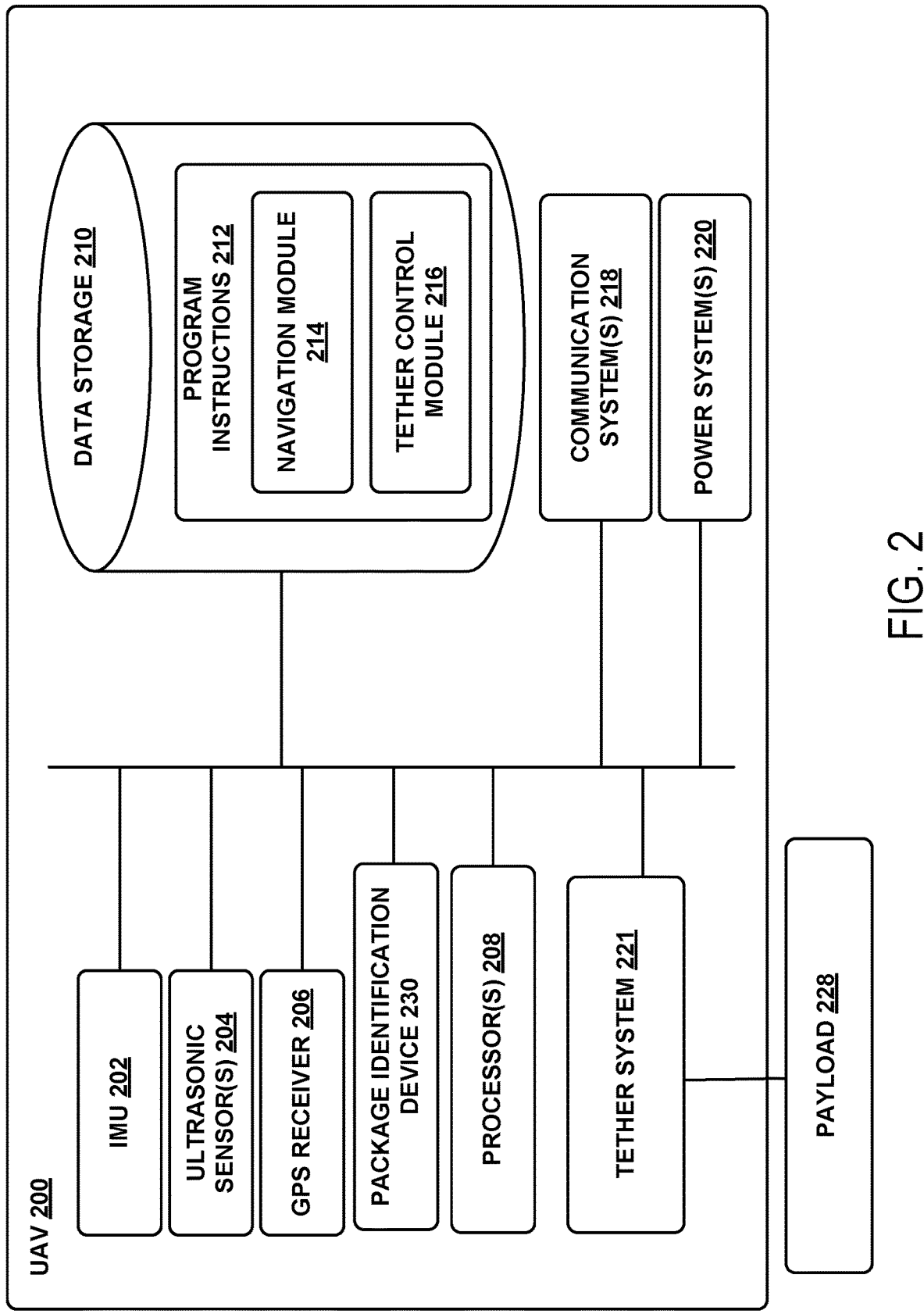
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location (e.g., a delivery location), the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, the power systems 220 of UAV 200 a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power systems 220 could include an inductive charging interface, such that recipient-assisted recharging can be accomplished wirelessly via an inductive charging system installed or otherwise available at the delivery location.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In some embodiments, a payload 228 may simply be the one or more items that are being delivered (e.g., without any package housing the items). And, in some embodiments, the items being delivered, the container or package in which the items are transported, and/or other components may all be considered to be part of the payload.

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

In some arrangements, a UAV may not include a tether system 221. For example, a UAV could include an internal compartment or bay in which the UAV could hold items during transport. Such a compartment could be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated, that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to a tether system 221.

F. Package Identification Device

The UAV 200 can include a package identification device 230 that can be used to identify payload 228. Within examples, the package identification device 230 can be arranged on a surface of the UAV 200 that has a direct view of the payload 228. For instance, the package identification device 230 can be arranged on a surface of a payload compartment (see, e.g., compartments 506 and 604 in FIGS. 5 and 6, respectively). Other arrangements are possible.

Within examples, the package identification device 230 can be a sensor or a scanner that employs various technologies to interact with the payload 228 in order to identify the payload 228. For instance, the package identification device 230 can employ one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Additionally and/or alternatively, the package identification device 230 can employ various scanning technologies such as a 1-D or 2-D barcode scanner. Additionally and/or alternatively, the package identification device 230 can employ various image-capturing technologies such as cameras. Additionally and/or alternatively, the package identification device 230 can employ various text recognition software that can read identifying text (e.g., printed or handwritten) on the package.

IV. ILLUSTRATIVE UAV DEPLOYMENT SYSTEMS

Figure 3:
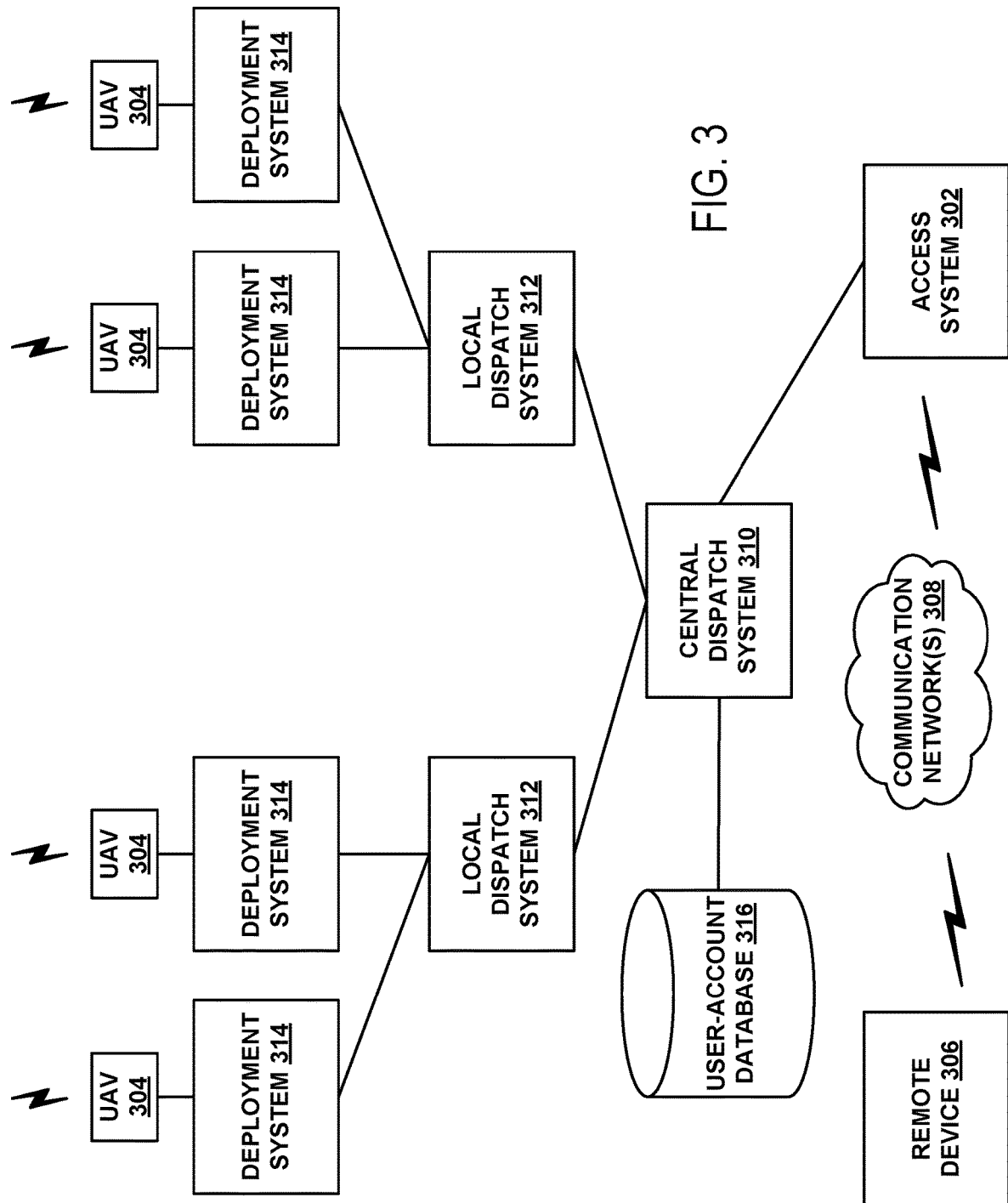
FIG. 3 is a simplified block diagram illustrating a distributed UAV system, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, an ATSP can be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Figure 4:
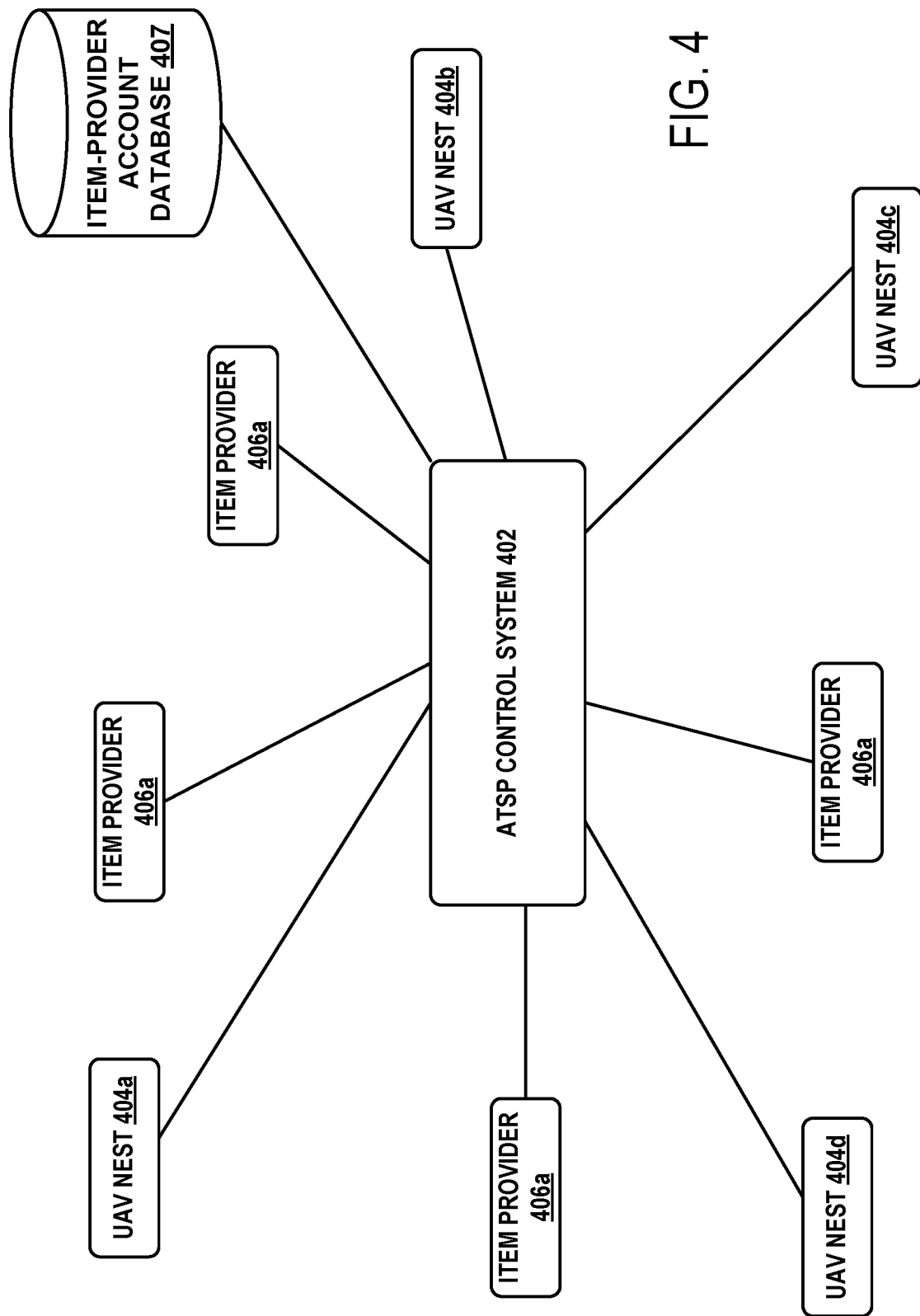
FIG. 4 is a block diagram showing an example arrangement for a transport provider system, according to example implementations.

FIG. 4 is a block diagram showing an example arrangement for an aerial transport provider control system 402, which coordinates UAV transport services for a plurality of item providers that are located remotely from the service provider's dispatch locations, and served by a plurality of UAV hubs at various locations. As shown, an aerial transport service provider (ATSP) 402 may be communicatively coupled to UAV nests 404a to 404d, and communicatively coupled to item-provider computing systems 406a to 406d. Such communicative couplings may be implemented using various types of wired and/or wireless communication protocols and networks.

Each UAV nest 404a to 404d is a facility where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d could also take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. Further, ATSP 402 may store data for item-provider accounts in an item-provider account database 407.

In practice, a given item-provider computing system 406a to 406d may include one or more remote computing devices (e.g., such as one or more remote devices 306 described in reference to FIG. 3), which have logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more dedicated user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the UAV transport service provider 402 can dynamically redistribute UAVs amongst a number of UAV deployment locations (which may be referred to as, e.g., "hubs" or "nests") through a service area, according to time-varying levels of demand at various locations or sub-areas within the service area.

With such an arrangement, a delivery flight may involve the additional flight leg to fly from the UAV hub to the item-provider's location to pick up the item or items for transport, before flying to the delivery location, as compared to an arrangement where delivery UAVs are stationed at the source location for items (such as a distributor or retailer warehouse or a restaurant). While the flight leg between the UAV hub and a loading location has associated costs, these costs can be offset by more efficient use of each UAV (e.g., more flights, and less unnecessary ground time, in a given period of time), which in turn can allow for a lesser number of UAVs to be utilized for a given number of transport tasks.

VI. METHODS FOR UPDATING A TRANSPORT TASK OF A UAV

As noted, some example embodiments can involve methods that can increase the efficiency, reliability, and speed of the transportation services provided by the ATSP. In an embodiment, a method can involve the ATSP dynamically updating a transport task of a UAV based on a package that is picked up by the UAV. Doing so allows the UAV to receive a route to a delivery location of any item that the UAV picks up. As such, the UAV does not need to be assigned a specific item for pick up, and the UAV can pick up any item that is ready for delivery without wasting its resources waiting for the item provider to locate an item that is assigned to the UAV. Additionally, as explained herein, the capability of dynamically updating the transport task of the UAV based on the package picked up by the UAV can allow the ATSP to correct any detected errors at an early stage in the delivery.

As explained above, the ATSP can provide transport services to an item provider in response to receiving a transport service request from the item provider. The request can include information about the loading location and information about the packages for delivery, such as a quantity, dimensions, delivery locations, and characteristics of the packages, among other information. A package can include different types of goods and items, typically sold by the item provider. In an example, the package can include one or more goods or items that are going to the same delivery location.

In an embodiment, the ATSP can process the request to determine a quantity of UAVs to send to the loading location. In an example, the ATSP can deploy a UAV for each delivery location provided in the request. As such, packages that are being delivered to the same location can be delivered the same UAV. In other examples, the ATSP can deploy more than one UAV for each delivery location if the packages that are to be delivered to the delivery location would not fit in a payload compartment of a single UAV. Then, to deploy the UAVs, the ATSP can assign each UAV a respective transport task that instructs the UAV to fly to the loading location to pick up one or more packages.

In line with the discussion above, to expedite the pick-up process, when a UAV arrives at a loading location, the transport task can instruct the UAV to pick up a package at random, in a predetermined order or sequence, or otherwise without specific package assignment, from the packages that are ready for delivery at the loading location. In an example, the UAVs can pick up packages in an order of arrival to the loading location. As such, the UAVs can avoid any potential collisions that could result from more than one UAV attempting to pick up the same package at the same time. In another example, the ATSP can assign the UAVs an order in which to pick up packages. Other examples of determining an order in which the UAVs pick up packages are also possible.

In an embodiment, at the loading location, a package can be loaded by the item provider into a payload compartment of the UAV. For instance, the item provider can use manual labor or automation (e.g., a robotic arm) to load packages into the payload compartment. The UAV can idle as the package is being loaded until the UAV determines that the package has been secured in the payload compartment, perhaps using sensors located in the payload compartment. If the package is not secured in the payload compartment, the UAV can provide the item provider with an alert, such as a visual alert on a device that the item provider uses to interface with the ATSP or an audible sound (e.g., an alarm).

Once the package is secured in the payload compartment, the package can begin to depart the loading location. As the UAV is doing so, the ATSP can identify the package in the payload compartment, perhaps using a package identification device installed in the payload compartment. In particular, the package identification device can identify the package by scanning, reading, or otherwise sensing a unique identifier coupled to the package. The unique identifier can be some combination of a 1-D or 2-D barcode, RFID, printed label, or other identifying feature, attached to the package. Additionally and/or alternatively, the package can include electrical contacts that can couple with the package identification device, which allow the package to interface with the package identification device (and by extension the ATSP). Accordingly, the package identification device can include a scanner that can read 1-D or 2-D barcodes or perform OCR on a printed label, an RFID reader, a Bluetooth or Bluetooth Low Energy (BLE) module, and/or electrical outlets that can couple to the electrical contacts on the package, among other examples.

Once the package identification device determines the unique identifier of the package, the device can send the unique identifier to the ATSP. The ATSP can use the unique identifier to identify the package, for example by searching the task requests sent to the ATSP by the item provider. Within examples, the transport task requests can include information about the package, including a delivery location of the package, a dimension of the package, a scheduled time of delivery, a level of urgency, fragility, a temperature constraint on the package, among other information. Accordingly, the ATSP can use the unique identifier to determine, among other things, the delivery location of the package.

Once the ATSP determines the delivery location of the package, the ATSP can generate a task update for the UAV. In particular, the task update can include a delivery location of package in the payload compartment of the UAV. For instance, the task update can include a route from a current location of the UAV (e.g., the loading location) to the delivery location. The task update can include other information about the delivery location such as where to drop-off package at the delivery location, and whether there are additional delivery instructions for the package (e.g., required signature for receipt of the package). The UAV can then proceed to the fly to the delivery location to deliver the package.

Figure 5A:
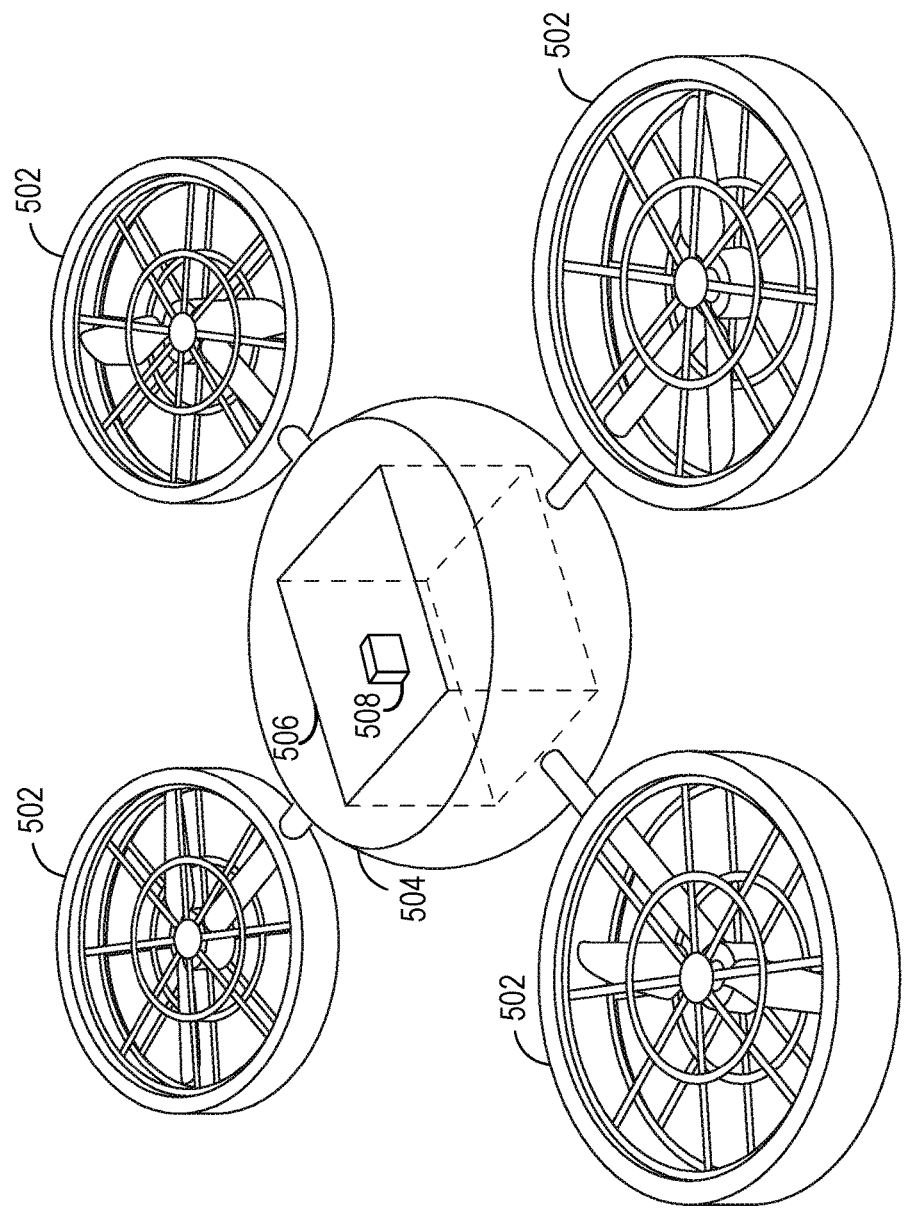
FIGS. 5A and 5B are simplified illustrations of an unmanned aerial vehicle having a scanning device installed in a payload compartment, according to example implementations.
Figure 5B:
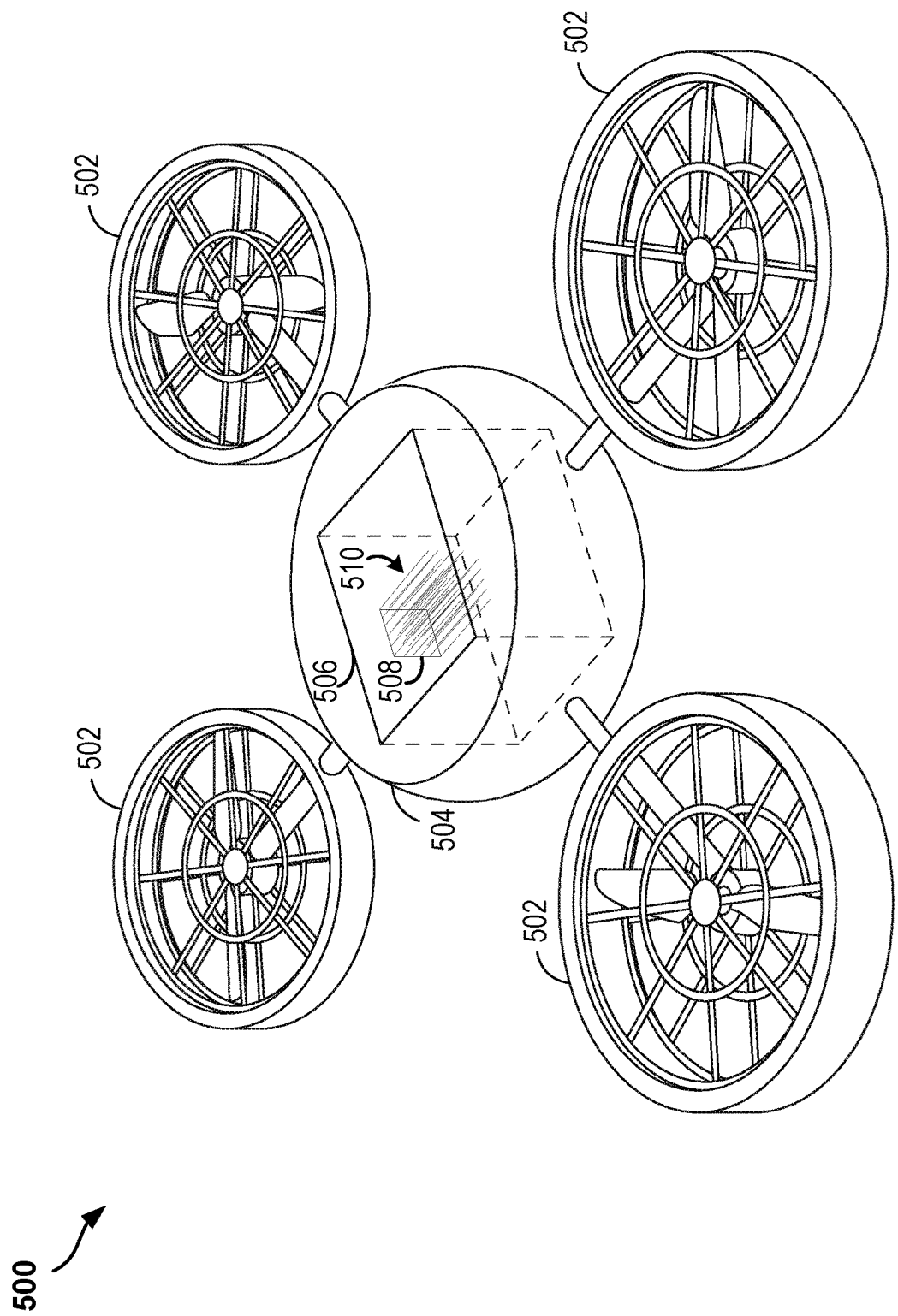

FIGS. 5A and 5B illustrate a UAV 500 arranged in accordance with the present disclosure. Although, the UAV 500 is shown as taking the form of a quadcopter UAV, a UAV arranged in accordance with the present disclosure could take on any feasible form.

FIGS. 5A and 5B illustrate a top perspective in which a top side of the UAV 500 is shown. As shown, the UAV 500 includes a propulsion unit 502 having unexposed propellers that are surrounded by a casing. Further, the UAV 500 includes a fuselage 504 to which the propulsion unit 502 is connected. Yet further, the UAV 500 includes a payload compartment 506 that is formed within the fuselage 504, thereby providing for loading of a package into the compartment 506.

As illustrated in FIG. 5A, a package identification device 508 is arranged on an interior surface of the compartment 506. Within examples, the package identification device 508 can be one of: a scanner that can read 1-D or 2-D barcodes or perform OCR on a printed label, an RFID reader, a Bluetooth or Bluetooth Low Energy (BLE) module, and/or electrical outlets that can couple to electrical contacts on the package, among other examples. In some examples, more than one package identification device 508 can be installed in the compartment 508. Additionally and/or alternatively, the package identification device 508 can be installed on any surface (interior or exterior) of the compartment 506. Further, the package identification device 508 can be installed on any surface of the UAV 500. For instance, package identification device 508 can be arranged on an exterior surface of the UAV 500 such that a package may be identified as it is being loaded into the UAV 500.

For example, as illustrated in FIG. 5B, the package identification device 508 can be a scanner that emits beams 510 (visible or invisible) that can be used to read a unique identifier (e.g., unique identifier 610 in FIG. 6) on a package that is loaded into the compartment 506. In some examples, the unique identifier can be placed on a surface of the package. Accordingly, in order for the scanner 508 to be able to scan the unique identifier, the surface with the unique identifier must be facing the scanner 508 when the package is placed into the compartment 506. In such examples, to ensure that the package is placed in the correct orientation, the UAV 500 may include a visual indicator on the body of the UAV indicating where the scanner 508 is located. Additionally and/or alternatively, the ATSP can inform the item provider, perhaps via computer device interface, where the scanner 508 is located in the UAV 500.

In an embodiment, if the package identification device 508 does not detect a unique identifier on a package, the UAV 500 can inform the ATSP that the unique identifier is missing. In one example, the ATSP can identify the package using a process of elimination (e.g., if all of the other packages to be picked up at a same location were identified, or by using a weight, temperature range, or other identifying feature that may be sensed by package identification device 508 or other sensors on UAV 500). However, if the ATSP is not able to identify the package, the package can be returned to loading location or to a drop-off location that may be specified in advance or determined dynamically.

Figure 6:
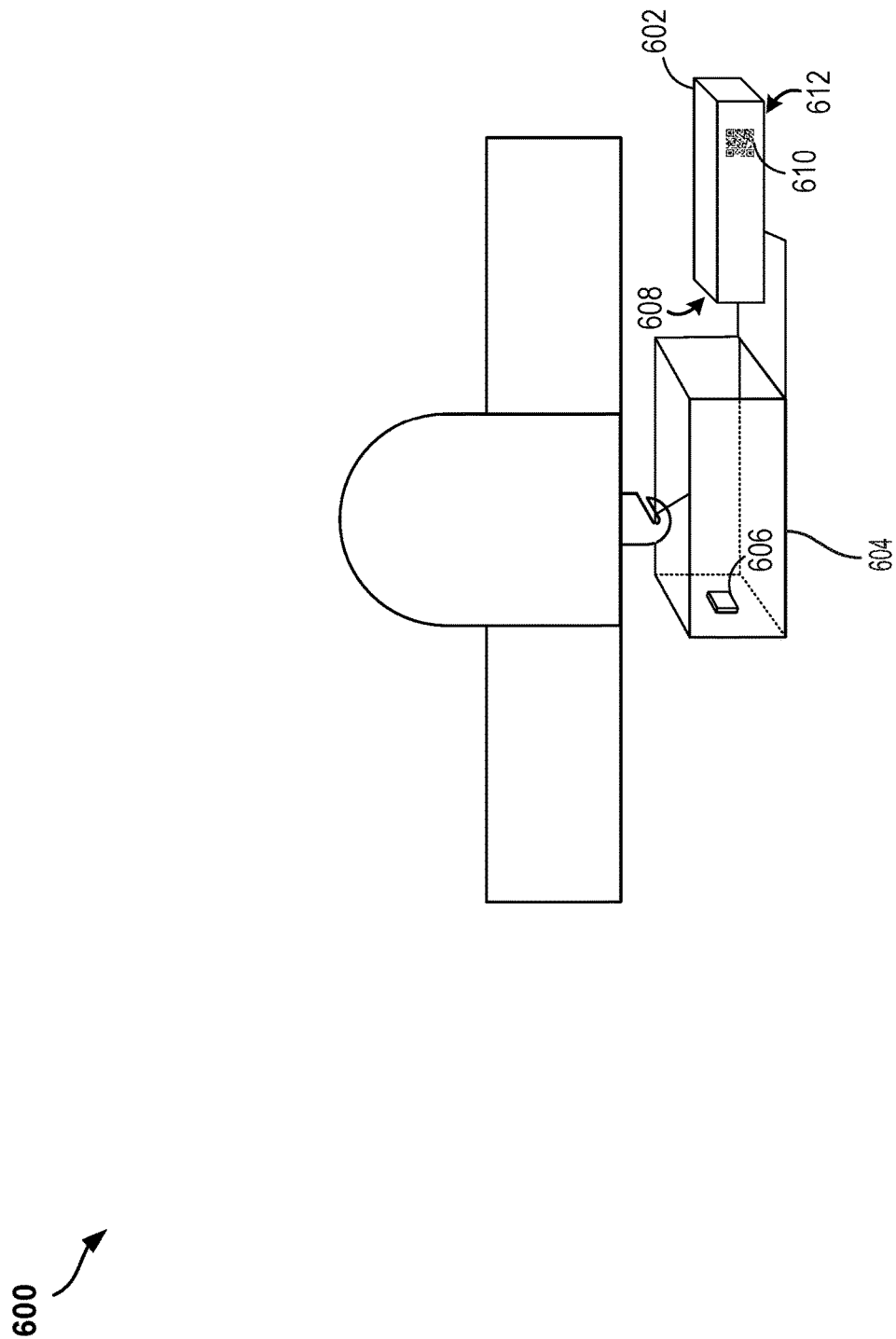
FIG. 6 is a simplified illustration of a package being placed into a payload compartment of an unmanned aerial vehicle, according to example implementations.

FIG. 6 illustrates a UAV 600 arranged in accordance with the present disclosure. As illustrated in FIG. 6, the UAV the compartment 604 is attached to the UAV 600 and located substantially outside of the UAV 600 during some or all of a flight by the UAV 600. Specifically, the compartment 604 is tethered or otherwise releasably attached below the UAV during flight to a delivery location. As also illustrated in FIG. 6, a package identifier device 606 is arranged on an interior surface of the compartment 600. In examples where the package identifier device 606 is a scanner, the scanner 606 can scan a unique identifier (not illustrated) on a surface 608 of a package 602 that is being loaded into the compartment 604. Within examples, a unique identifier may be arranged on more than one surface of the package 602. For instance, as illustrated in FIG. 6, in addition to the unique identifier (not illustrated) arranged on the surface 608, a unique identifier 610 is arranged on a surface 612 of the package. In other examples, compartment 604 may be configured to have different (e.g., more aerodynamic) outer shapes.

Figure 7A:
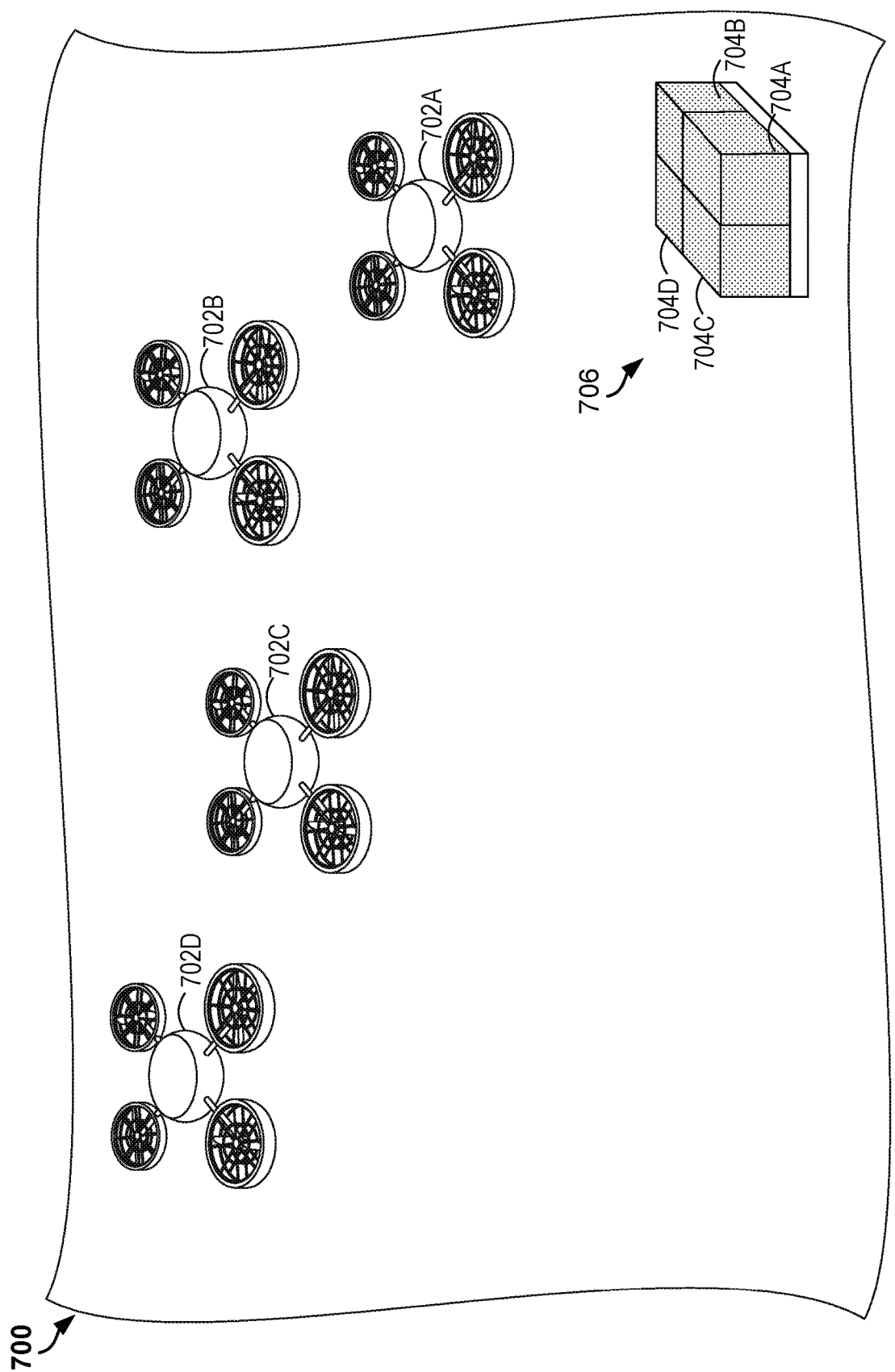
FIGS. 7A and 7B each illustrate a fleet of unmanned aerial vehicles picking up packages, according to example implementations.
Figure 7B:
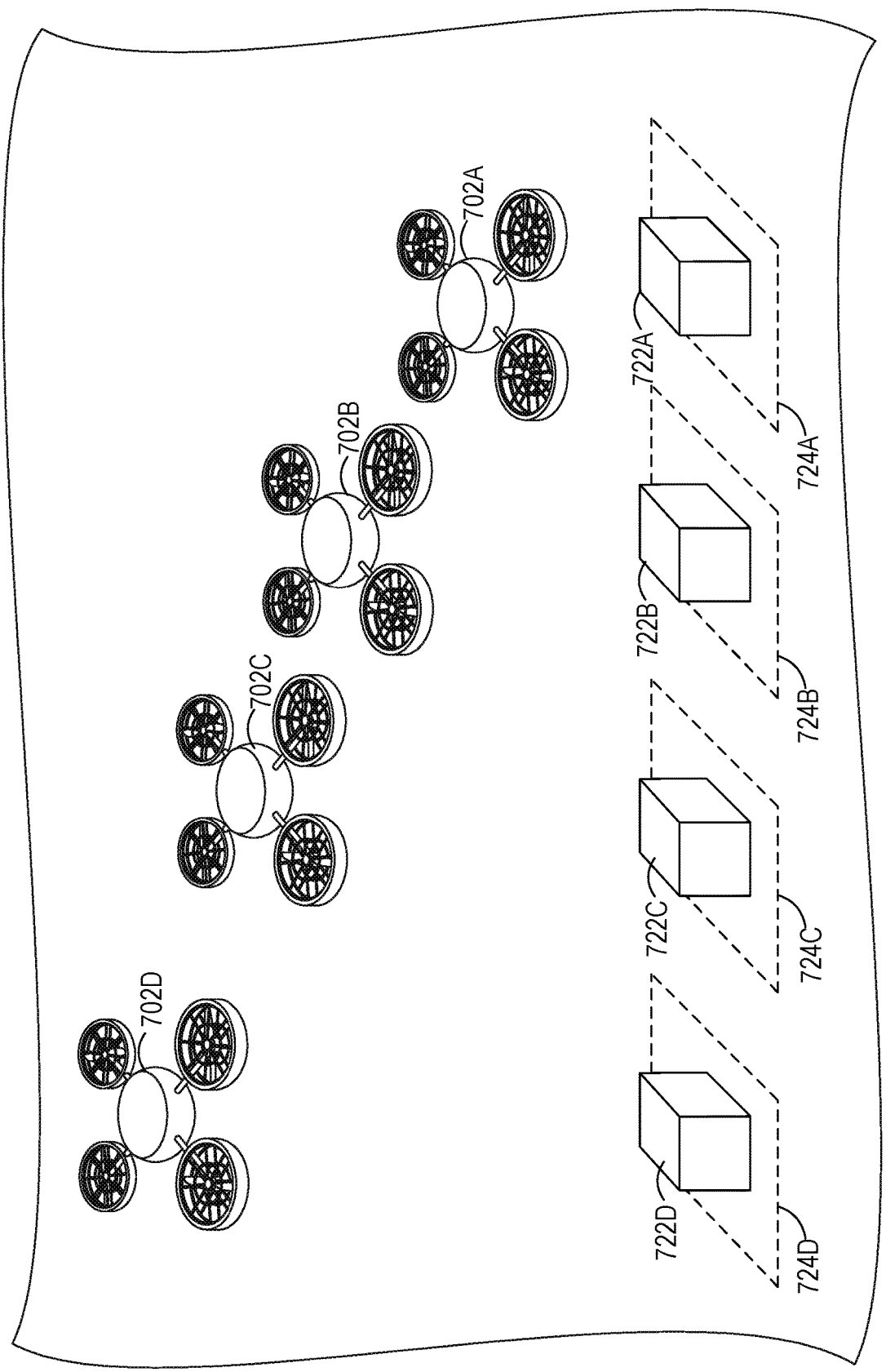

FIGS. 7A and 7B next illustrate scenarios in which the ATSP can dynamically update a transport task of a UAV, according to example embodiments.

FIG. 7A illustrates scenario 700 in which an item provider requests from the ATSP to deliver packages 704A, 704B, 704C, and 704D, which are located at loading location 706 associated with the item provider. In response to the request, the ATSP can assign transport tasks to UAVs 702A, 702B, 702C, and 702D. In particular, the respective transport task for each UAV instructs the UAV to fly to the loading location 706, and to pick up a package from the packages 704A-704D. In an embodiment, the transport tasks can instruct the UAVs 702A-702D to pick up packages in an order of arrival to the loading location 706. Additionally, the transport task can instruct the UAVs to pick up packages at random.

Accordingly, the UAV 702A, which arrives first to the loading location 706, can pick up a first package from the packages 704A-704D. For instance, the UAV 702A can randomly pick up the package 704A. Once the package 704A is loaded into a compartment of the UAV 704A, the UAV 704A or the ATSP can inform the UAV that arrived after the UAV 704A that the UAV 704A has picked up a package. For instance, the UAV 704A can inform the UAV 704B, which arrived immediately after 702A, that the UAV 702A has picked up the package 704A.

Additionally, once the package 704A is loaded into a compartment of the UAV 704A, the ATSP can identify the package 704A. In particular, the ATSP can use a package identification device located in the compartment of the UAV 702A in order to identify the package 704A. For instance, the package identifier device can determine a unique identifier of the package, and can provide the unique identifier to the ATSP. The ATSP can then use the unique identifier to determine information about the package 704A, perhaps by performing a search in a database provided by the item provider. Other methods of determining information about the package are also possible.

In an embodiment, in response to identifying the package, the ATSP can determine a route from the loading location 706 to a delivery location of the package 704A. The ATSP can then update the transport task of the UAV 702A to provide the UAV 702A with the route so that the UAV 702A can deliver the package 704A by following the determined route. In another embodiment, the ATSP can determine a delivery location for each of the UAVs 702A-702D once all of the UAVs 702A-702D have picked up and identified their respective packages. Based on the respective delivery location of each package, the ATSP can determine a respective route for each of the UAVs 702A-702D. The ATSP can then send each of the UAVs 702A-702D a respective task update that provides the respective UAV with the respective route.

FIG. 7B illustrates a scenario 720 in which an item provider requests from the ATSP to deliver packages 722A, 722B, 722C, and 722D. In this scenario, the packages 722A-722D are each placed in a respective loading pad 724A-724D. In this arrangement, the UAVs 702A-702D can each pick up a respective package simultaneously or within a short time period of time with respect to one another. Other loading arrangements are also possible.

A. Detecting an Incorrect Package Loaded into the UAV

In some examples, it can still be useful to assign UAVs to pick up specific packages, perhaps because of a special characteristic of a package such as fragility. However, loading assigned packages into a UAV is error-prone. Specifically, when an item provider loads a package into a payload compartment, it is possible, e.g., due to human error, that the item provider loads an incorrect package (i.e., a package that was not assigned to the UAV). In conventional practice, such errors often are not discovered until a later time, usually when the UAV delivers the incorrect package to a recipient that is supposed to receive the package that originally was assigned to the UAV. The recipient must then go through an extensive, and often cumbersome, process to return the incorrect package to the item provider and to receive the correct package. Not only that, but in instances where a delivery is time sensitive, a delivery mix-up will lead to an unsatisfactory customer experience.

In an embodiment, the ATSP can avoid incorrect deliveries by updating a transport task of a UAV based on the package that is loaded into the payload of the UAV. In particular, the ATSP can assign a transport task to a UAV, where the transport task specifies a specific package to pick up and deliver. Additionally, the transport task can include a route from the UAV's starting location (e.g., a nest) to the loading location, and a route from the loading location to the delivery location of the specific package. Accordingly, the UAV can follow the determined route from its starting position to the loading location to pick up an assigned package. At the loading location, an item provider can load a package into a payload compartment of the UAV. Once the package is secured in a compartment payload, the UAV can begin to fly along the route from the loading location to the delivery location of the UAV.

Additionally, once the package is secured in the payload compartment, the ATSP can identify the package in the compartment in order to confirm that the package loaded into the payload compartment is indeed the package that is assigned to the UAV. For instance, the ATSP can cause a package identification device to identify a unique identifier located on the package. The ATSP can then use the unique identifier to determine whether the package in the payload is the package that is assigned to the UAV. If the package is in fact the package that is assigned to the UAV, the UAV can continue to fly to the delivery location of the package.

Conversely, if the package is not that package that is assigned to the UAV, then the ATSP can determine whether the UAV can deliver the "incorrect" package to its intended delivery location. For instance, the ATSP can determine whether the UAV has enough battery power to complete delivery of the incorrect package to its intended delivery location, and in some cases, return to a nest or otherwise not become stranded. In other examples, the ATSP also can consider further missions or transport tasks for the UAV in its determination of whether the UAV can complete delivery of said incorrect package. In still other examples, the ATSP also can modify or adjust future missions or transport tasks for the UAV based on dynamic updates being made to the current transport task. If the UAV can deliver the package, then the ATSP can send a task update to the UAV instructing the UAV to deliver the incorrect package. Additionally, the task update can include a route from a current location of the UAV to a delivery location of the package. The ATSP can also send assign a transport task to another UAV to pick up and deliver the package However, if the UAV is not capable of delivering the package, or instructed to not deliver the package for any other reason, the UAV can send a task update to the UAV instructing the UAV to return the package to the loading location or another drop-off location. The ATSP can then assign a transport task to another UAV instructing another UAV to pick up and deliver the package. Additionally, once the UAV returns or drops off the package, the ATSP can assign a transport task to the UAV to pick up and deliver the package that was supposed to be delivered initially.

Accordingly, by dynamically updating a transport task of a UAV based on the package that is loaded into the UAV allows.

B. Example Methods of Operation

Figure 8:
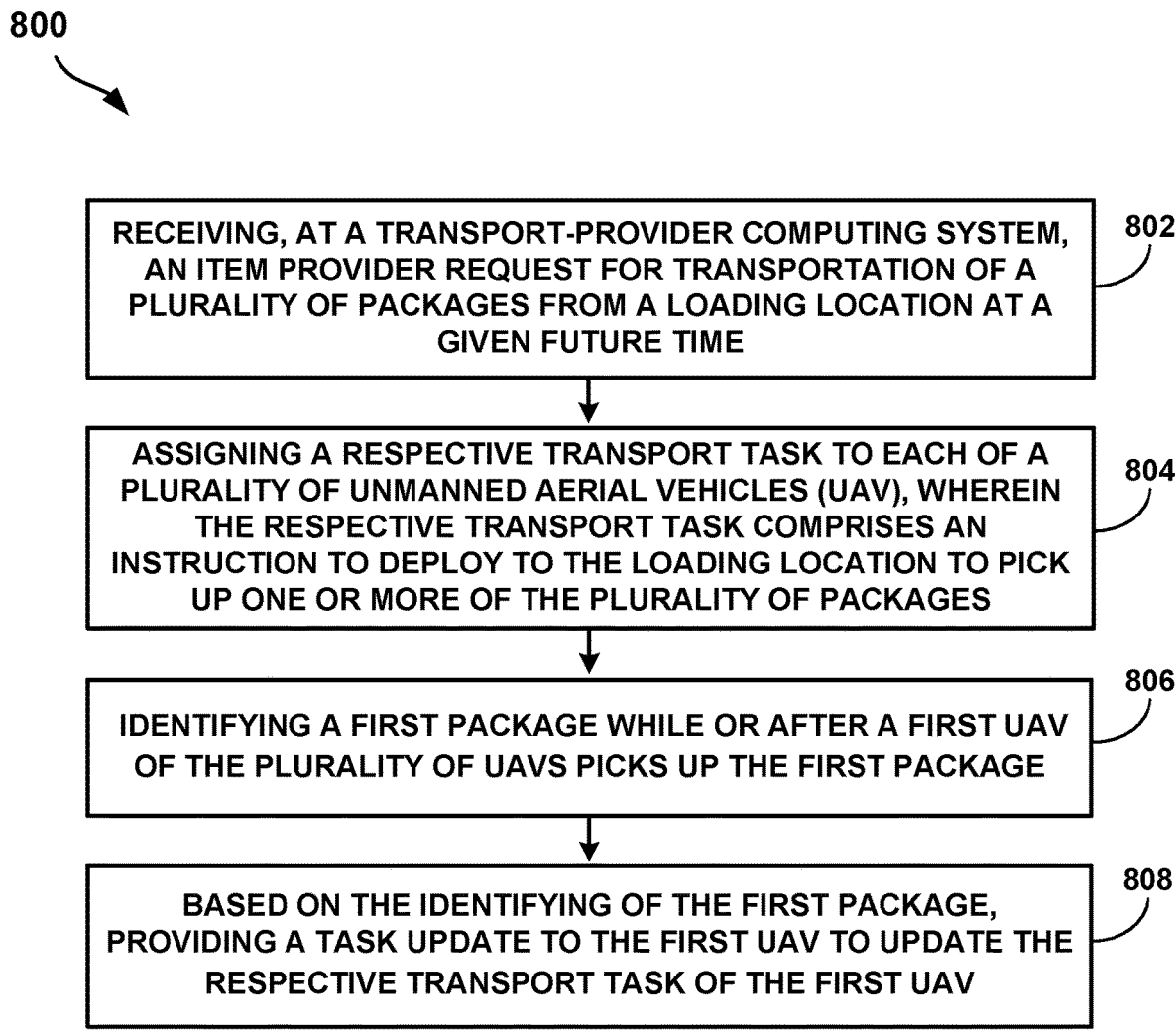
FIG. 8 is a flowchart of a method, according to example implementations.

FIG. 8 is a flowchart illustrating a method 800, which relates to dynamically updating a transport task of a UAV.

Method 800 shown in FIG. 8 (and other processes and methods disclosed herein) presents a method that can be implemented within an arrangement involving, for example, any of the systems shown in FIGS. 1A to 6 (or more particularly by one or more components or subsystems thereof, such as by a processor and a non-transitory computer-readable medium having instructions that are executable to cause the device to perform functions described herein), among other possible systems.

Method 800 and other processes and methods disclosed herein may include one or more operations, functions, or actions, as illustrated by one or more of blocks 802-806 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Within examples, the method 800 can be performed by an ATSP control system, such as the ATSP control system 402 of FIG. 4. Alternatively, the method 800 can be performed by a controller of a UAV, e.g., processor 208 of FIG. 2.

At block 802, the method 800 may involve receiving, at a transport-provider computing system, an item provider request for transportation of a plurality of packages from a loading location at a given future time. As explained above, an item provider (e.g., item provider 406 in FIG. 4A) could request from an ATSP control system transportation services for one or more packages. Within examples, each package can include one or more items that are grouped together based on the delivery destination of the items. For instance, items that are grouped together in a package could be going to the same destination. Accordingly, the request can include information about the packages for delivery such as quantity, dimensions and weight, delivery locations, urgency, fragility, among other examples.

At block 804, the method 800 may involve assigning a respective transport task to each of a plurality of unmanned aerial vehicles (UAV), wherein the respective transport task comprises an instruction to deploy to the loading location to pick up one or more of the plurality of packages. In particular, a transport task for a UAV can instruct the UAV to fly to the loading location to pick up one or more of the plurality of packages for delivery at the loading location. The transport task can also include a route from a nest of the UAV to the loading location. This route is the first segment of the UAV's flight while performing the task. In one example, the transport task does not assign the UAV a particular package to pick up. As such, the generated task, at this point, only includes information about the first flight segment. In another example, the transport task does assign the UAV a particular package to pick up. Thus, the generated task can also include a route for the second flight segment from the loading location to the delivery location of the particular package.

In response to receiving a transport task, each UAV can fly to the loading location. Once at the loading location, the plurality of UAVs can begin to pick up packages. In an example, if each of the plurality of UAVs is not assigned particular packages, then each UAV can pick up any package as explained above. In another example, if each of the plurality of UAVs is assigned particular packages, then each UAV can pick up its assigned package.

At block 806, the method 800 may involve identifying a first package while or after a first UAV of the plurality of UAVs picks up the first package. During or after the first UAV picks up the first package and secures the first package in a payload compartment of the UAV, a package identification device can identify the package, according to embodiments described herein. For instance, the package identification device can scan a label attached to the package in order to identify a unique identifier located on the package.

At block 808, the method 800 may involve based on the identifying of the first package, providing a task update to the first UAV to update the respective transport task of the first UAV. In a first example, if the first UAV is not assigned a package, then the task update can update the transport task to include a second flight segment. In particular, the second flight segment can be between the loading location and the delivery location of the first package.

In a second example, if the first UAV is assigned a package, then the task update can update the transport task if the first package is not the package that is assigned to the first UAV. In this example, the task update can instruct the UAV to deliver the first package to its intended recipient. Thus, the task update can update the delivery location of the transport task from the delivery location of the particular package to the delivery location of the first package that was loaded into the payload compartment of the UAV. Alternatively, the task update can instruct the UAV to drop-off the first package at a drop-off location or return it to the loading location.

Figure 9:
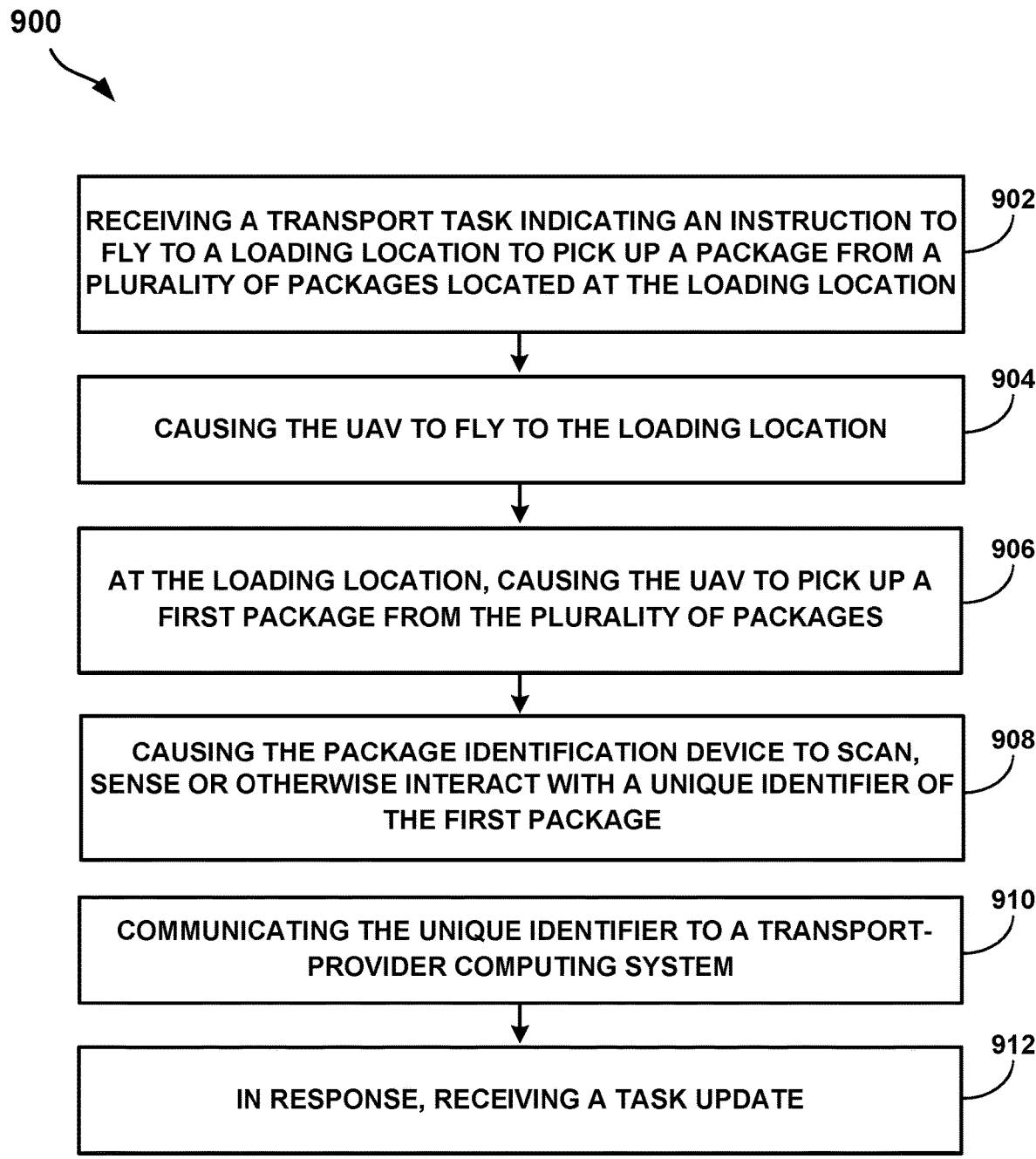
FIG. 9 is a flowchart of another method, according to example implementations.

FIG. 9 is a flowchart illustrating a method 900, which relates to a UAV receiving a task update.

At block 902, the method 900 involves receiving a transport task indicating an instruction to fly to a loading location to pick up a package from a plurality of packages located at the loading location. For instance, the transport task can be received from an ATSP system. At block 904, the method 900 involves causing the UAV to fly to the loading location. And at block 906, the method 900 involves at the loading location, causing the UAV to pick up a first package from the plurality of packages, which may be done at random, in a predetermined order or sequence, or otherwise without specific package assignment. At block 908, the method involves causing the package identification device to scan, sense or otherwise interact with a unique identifier of the first package. At block 910, the method involves communicating the unique identifier to a transport-provider computing system (e.g., the ATSP system). At block 912, the method 900 involves receiving a task update.

III. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving, at a transport-provider computing system, an item provider request for transportation of a plurality of packages from a loading location at a given future time;
assigning, by the transport-provider computing system and for each respective unmanned aerial vehicle (UAV) of a plurality of UAVs, a respective transport task to the respective UAV, wherein the respective transport task (i) comprises an instruction to deploy the respective UAV to the loading location and pick up a package from the plurality of packages, and (ii) lacks a specific package assignment for the respective UAV, wherein the respective UAV is configured to determine the specific package assignment by autonomously picking up a respective package from the plurality of packages upon arriving at the loading location;
identifying, by the transport-provider computing system and for each respective UAV, the respective package picked up by the respective UAV while or after the respective UAV picks up the respective package by instructing a package identifying device installed within a payload compartment of the respective UAV to identify the respective package by detecting a unique identifier provided as part of the respective package, wherein the respective UAV is configured to receive the respective package into the payload compartment in an orientation that positions the unique identifier in a predetermined orientation relative to the package identifying device; and
based on the identifying of the respective package, providing, by the transport-provider computing system and to each respective UAV, a respective task update configured to update the respective transport task of the respective UAV.

2. The method of claim 1, wherein a quantity of the plurality of UAVs is the same as a quantity of the plurality of packages.

3. The method of claim 1, wherein the instruction to deploy the respective UAV to the loading location and pick up the package comprises an instruction to pick up the package at random from the plurality of packages, and wherein the respective UAV is configured to determine the specific package assignment by picking up the respective package at random upon arriving at the loading location.

4. The method of claim 1, wherein the instruction to deploy the respective UAV to the loading location and pick up the package comprises an instruction to pick up the package from the plurality of packages in an order of arrival, at the loading location, of the respective UAV relative to one or more other UAVs of the plurality of UAVs, and wherein the respective UAV is configured to determine the specific package assignment by picking up the respective package in the order of arrival of the respective UAV at the loading location.

5. The method of claim 1, wherein the providing, by the transport-provider computing system, the respective task update to the respective UAV to update the respective transport task of the respective UAV comprises:
   determining a respective delivery location of the respective package; and
   transmitting to the respective UAV a respective route from a current location of the respective UAV to the respective delivery location of the respective package.

6. The method of claim 1, further comprising:
   determining, by the transport-provider computing system and for each respective UAV, a respective delivery location of the respective package picked up by the respective UAV.

7. The method of claim 6, further comprising:
   based on the respective delivery location of the respective package picked up by each respective UAV, determining, by the transport-provider computing system and for each respective UAV, a respective route from the loading location to the respective delivery location of the respective package picked up by the respective UAV.

8. The method of claim 1, further comprising:
   determining, by the transport-provider computing system, a first delivery location of a first package picked up by a first UAV of the plurality of UAVs;
   based on one or more characteristics of the first UAV, determining, by the transport-provider computing system, that the first UAV is capable of delivering the first package to the first delivery location; and
   based on determining that the first UAV is capable of delivering the first package to the first delivery location, providing the respective task update to the first UAV.

9. The method of claim 8, wherein the respective task update provided to the first UAV comprises an instruction to deliver the first package to the first delivery location.

10. The method of claim 1, further comprising:
    based on one or more characteristics of a first UAV of the plurality of UAVs, determining, by the transport-provider computing system, that the first UAV is not capable of delivering a first package picked up by the first UAV; and
    based on determining that the first UAV is not capable of delivering the first package, providing the respective task update to the first UAV, wherein the respective task update provided to the first UAV comprises an instruction to drop off the first package at the loading location or a nearby drop-off location.

11. The method of claim 10, further comprising:
    based on one or more characteristics of a second UAV of the plurality of UAVs, determining, by the transport-provider computing system, that the second UAV is capable of delivering the first package to a first delivery location of the first package; and
    deploying, by the transport-provider computing system, the second UAV to pick up the first package and deliver the first package to the first delivery location of the first package.

12. The method of claim 1, wherein the respective UAV is configured to autonomously pick up the respective package by identifying the respective package based on sensor data collected by the respective UAV after arriving at the loading location, wherein the sensor data represents a location of the respective package relative to one or more other packages of the plurality of packages while the respective package is disposed at the loading location.

13. The method of claim 1, wherein the item provider request specifies a number of UAV delivery flights by the plurality of UAVs for transportation of the plurality of packages from the loading location at the given future time.

14. The method of claim 1, wherein the item provider request specifies a rate of UAV delivery flights by the plurality of UAVs for transportation of the plurality of packages from the loading location at the given future time.

15. A non-transitory computer-readable medium having stored thereon program instructions that, when executed by a computing device, cause the computing device to perform operations comprising:
    receiving an item provider request for transportation of a plurality of packages from a loading location at a given future time;
    assigning, for each respective unmanned aerial vehicle (UAV) of a plurality of UAVs, a respective transport task to the respective UAV, wherein the respective transport task (i) comprises an instruction to deploy the respective UAV to the loading location and pick up a package from the plurality of packages, and (ii) lacks a specific package assignment for the respective UAV, wherein the respective UAV is configured to determine the specific package assignment by autonomously picking up a respective package from the plurality of packages upon arriving at the loading location;
    identifying, for each respective UAV, the respective package picked up by the respective UAV while or after the respective UAV picks up the respective package by instructing a package identifying device installed within a payload compartment of the respective UAV to identify the respective package by detecting a unique identifier provided as part of the respective package, wherein the respective UAV is configured to receive the respective package into the payload compartment in an orientation that positions the unique identifier in a predetermined orientation relative to the package identifying device; and
    based on the identifying of the respective package, providing, to each respective UAV, a respective task update configured to update the respective transport task of the respective UAV.

16. The non-transitory computer-readable medium of claim 15, wherein the instruction to deploy the respective UAV to the loading location and pick up the package comprises an instruction to pick up the package at random from the plurality of packages, and wherein the respective UAV is configured to determine the specific package assignment by picking up the respective package at random upon arriving at the loading location.

17. The non-transitory computer-readable medium of claim 15, wherein the instruction to deploy the respective UAV to the loading location and pick up the package comprises an instruction to pick up the one package from the plurality of packages in an order of arrival, at the loading location, of the respective UAV relative to one or more other UAVs of the plurality of UAVs, and wherein the respective UAV is configured to determine the specific package assignment by picking up the respective package in the order of arrival of the respective UAV at the loading location.

18. The non-transitory computer-readable medium of claim 15, wherein the providing the respective task update to the respective UAV to update the respective transport task of the respective UAV comprises:
   determining a respective delivery location of the respective package; and
   transmitting to the respective UAV a respective route from a current location of the respective UAV to the respective delivery location of the respective package.

19. A system comprising:
   a processor;
   a non-transitory computer-readable medium having stored thereon program instructions that, when executed by the processor, cause the processor to perform operations comprising:
      receiving an item provider request for transportation of a plurality of packages from a loading location at a given future time;
      assigning, for each respective unmanned aerial vehicle (UAV) of a plurality of UAVs, a respective transport task to the respective UAV, wherein the respective transport task (i) comprises an instruction to deploy the respective UAV to the loading location and pick up a package from the plurality of packages, and (ii) lacks a specific package assignment for the respective UAV, wherein the respective UAV is configured to determine the specific package assignment by autonomously picking up a respective package from the plurality of packages upon arriving at the loading location;
      identifying, for each respective UAV, the respective package picked up by the respective UAV while or after the respective UAV picks up the respective package by instructing a package identifying device installed within a payload compartment of the respective UAV to identify the respective package by detecting a unique identifier provided as part of the respective package, wherein the respective UAV is configured to receive the respective package into the payload compartment in an orientation that positions the unique identifier in a predetermined orientation relative to the package identifying device; and
      based on the identifying of the respective package, providing, to each respective UAV, a respective task update configured to update the respective transport task of the respective UAV.

20. The system of claim 19, wherein the instruction to deploy the respective UAV to the loading location and pick up the package comprises an instruction to pick up the package at random from the plurality of packages, and wherein the respective UAV is configured to determine the specific package assignment by picking up the respective package at random upon arriving at the loading location.

21. The system of claim 19, wherein the instruction to deploy the respective UAV to the loading location and pick up the package comprises an instruction to pick up the package from the plurality of packages in an order of arrival, at the loading location, of the respective UAV relative to one or more other UAVs of the plurality of UAVs, and wherein the respective UAV is configured to determine the specific package assignment by picking up the respective package in the order of arrival of the respective UAV at the loading location.

* * * * *